(12) United States Patent
Ma et al.

(10) Patent No.: US 11,573,399 B2
(45) Date of Patent: Feb. 7, 2023

(54) CAMERA OPTICAL LENS

(71) Applicant: AAC Optics (Suzhou) Co., Ltd., Suzhou (CN)

(72) Inventors: Jian Ma, Shenzhen (CN); Jia Chen, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 179 days.

(21) Appl. No.: 17/137,403

(22) Filed: Dec. 30, 2020

(65) Prior Publication Data
US 2022/0137336 A1     May 5, 2022

(30) Foreign Application Priority Data
Oct. 31, 2020   (CN) .......................... 202011196255.1

(51) Int. Cl.
*G02B 13/18*   (2006.01)
*G02B 9/14*    (2006.01)
*G02B 13/00*   (2006.01)
*G02B 9/16*    (2006.01)

(52) U.S. Cl.
CPC ........... *G02B 13/0035* (2013.01); *G02B 9/14* (2013.01); *G02B 9/16* (2013.01)

(58) Field of Classification Search
CPC ... G02B 9/00; G02B 9/06; G02B 9/12; G02B 9/14; G02B 9/16; G02B 13/00; G02B 13/001; G02B 13/0015; G02B 13/002; G02B 13/0035; G02B 13/008; G02B 13/14

USPC ........................................... 359/716, 733–785
See application file for complete search history.

(56) References Cited

U.S. PATENT DOCUMENTS

| | | | | |
|---|---|---|---|---|
| 6,970,306 B2 * | 11/2005 | Matsuo | ..................... | G02B 9/16 359/716 |
| 8,154,807 B2 * | 4/2012 | Tsai | ..................... | G02B 13/0035 359/716 |
| 11,209,619 B2 * | 12/2021 | Bian | ......................... | G02B 9/14 |
| 2018/0017763 A1 * | 1/2018 | Shi | ........................... | G02B 9/14 |

FOREIGN PATENT DOCUMENTS

JP    2005-345919    * 12/2005

* cited by examiner

*Primary Examiner* — Thong Q Nguyen
(74) *Attorney, Agent, or Firm* — W&G Law Group

(57) ABSTRACT

Disclosed is an optical lens, from an object side to an image side including a first lens, a second lens and a third lens. The camera optical lens satisfies: $1.20 \le f1/f \le 1.80$; $-2.00 \le f2/f \le -1.00$; $0.75 \le f3/f \le 1.10$; $-6.00 \le R2/R1 \le -2.00$; $2.20 \le R4/R3 \le 8.00$; $1.50 \le d2/d4 \le 3.50$; where f, f1, f2 and f3 denote a focal length of the camera optical lens, the first lens, the second lens and the third lens, respectively; R1, R2 denote a central curvature radius of an object-side surface and an image-side surface of the first lens, respectively; R3, R4 denote a central curvature radius of an object-side surface and an image-side surface of the second lens, respectively; d2 denotes an on-axis distance from the image-side surface of the first lens to the object-side surface of the second lens, and d4 denotes an on-axis distance from the image-side surface of the second lens to an object-side surface of the third lens.

8 Claims, 15 Drawing Sheets

CAMERA OPTICAL LENS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than a charge coupled device (CCD) or a complementary metal-oxide semiconductor sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a structure of a three-piece. Also, with the development of technology and the increase of the diverse demands of users, and as the pixel area of photosensitive devices is becoming smaller and smaller and the requirement of the system on the imaging quality is improving constantly, a three-piece lens structure gradually appears in lens designs. The present three-piece lens structure generally has good optical performance, however an optical focal length, lens spacing, a lens shape thereof are still arranged unreasonably, so that the nine-piece lens structure cannot meet a design requirement of wide-angle ultra-thin and ultra-thin in the case when the lens structure remains good optical characteristics.

Therefore, it is necessary to provide a camera optical lens with good optical performance and meeting a design requirement of wide-angle and ultra-thin.

SUMMARY

Some embodiments of this disclosure provide a camera optical lens. The camera optical lens includes, from an object side to an image side: a first lens having a positive refractive power; a second lens having a negative refractive power; and a third lens having a positive refractive power; wherein the camera optical lens satisfies following conditions: $1.20 \leq f1/f \leq 1.80$; $-2.00 \leq f2/f \leq -1.00$; $0.75 \leq f3/f \leq 1.10$; $-6.00 \leq R2/R1 \leq -2.00$; $2.20 \leq R4/R3 \leq 8.00$; $1.50 \leq d2/d4 \leq 3.50$; where, f denotes a focal length of the camera optical lens, f1 denotes a focal length of the first lens, f2 denotes a focal length of the second lens, f3 denotes a focal length of the third lens, R1 denotes a central curvature radius of an object-side surface of the first lens, R2 denotes a central curvature radius of an image-side surface of the first lens, R3 denotes a central curvature radius of an object-side surface of the second lens, R4 denotes a central curvature radius of an image-side surface of the second lens, d2 denotes an on-axis distance from the image-side surface of the first lens to the object-side surface of the second lens, d4 denotes an on-axis distance from the image-side surface of the second lens to an object-side surface of the third lens.

As an improvement, the camera optical lens further satisfies following conditions: $-10.00 \leq (R5+R6)/(R5-R6) \leq -3.00$; where, R5 denotes a central curvature radius of the object-side surface of the third lens, and R6 denotes a central curvature radius of an image-side surface of the third lens.

As an improvement, the camera optical lens further satisfies following conditions: $-1.43 \leq (R1+R2)/(R1-R2) \leq -0.22$; $0.06 \leq d1/TTL \leq 0.25$; where, d1 denotes an on-axis thickness of the first lens, and TTL denotes a total track length of the camera optical lens.

As an improvement, the camera optical lens further satisfies following conditions: $-5.33 \leq (R3+R4)/(R3-R4) \leq -0.86$; $0.04 \leq d3/TTL \leq 0.18$; where, d3 denotes an on-axis thickness of the second lens, and TTL denotes a total track length of the camera optical lens.

As an improvement, the camera optical lens further satisfies following conditions: $0.07 \leq d5/TTL \leq 0.32$; where, d5 denotes an on-axis thickness of the third lens, and TTL denotes a total track length of the camera optical lens.

As an improvement, the camera optical lens further satisfies following conditions: $FOV \geq 87.00°$; where, FOV denotes a field of view in a diagonal direction of the camera optical lens.

As an improvement, the camera optical lens further satisfies following conditions: $TTL/IH \leq 1.45$; where, IH denotes an image height of the camera optical lens, and TTL denotes a total track length of the camera optical lens.

As an improvement, the camera optical lens further satisfies following conditions: $-112.19 \leq f12/f \leq 12.47$; where f12 denotes a combined focal length of the first lens and the second lens.

BRIEF DESCRIPTION OF DRAWINGS

In order to make more clearly technical solutions of embodiments in the present disclosure, accompanying drawings, which are used in the description of the embodiments, will be described briefly in the following. Obviously, the accompanying drawings in the following description are only some examples of the present disclosure. Those skilled in the art, without creative work, may obtain other drawings based on these drawings.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Frist Embodiment

Figure 1:
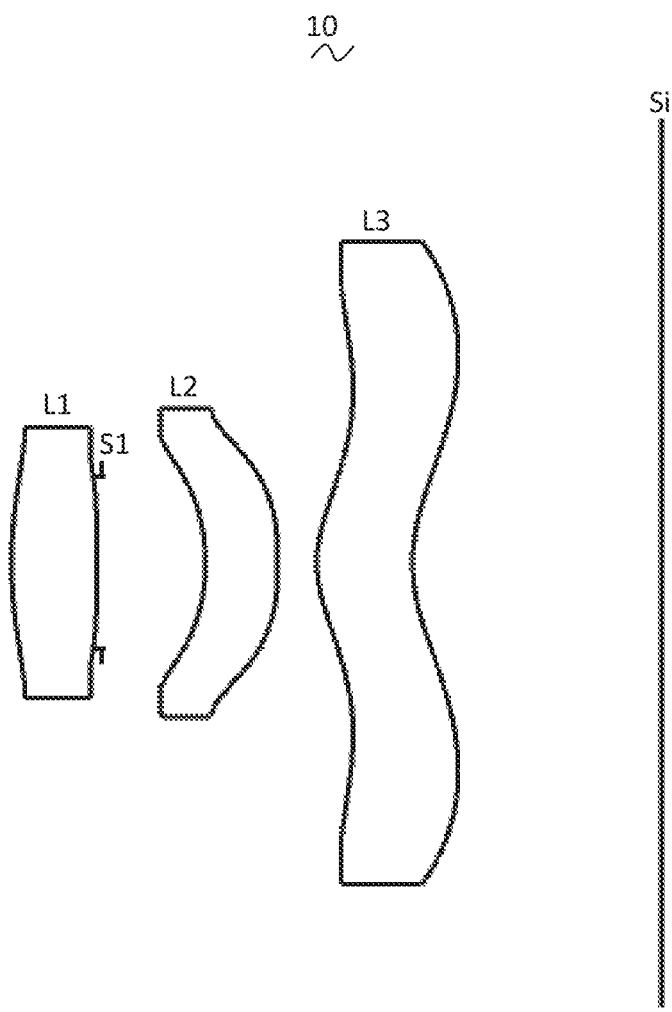
FIG. 1 is a schematic diagram of a structure of a camera optical lens according to a first embodiment of the present disclosure.

Referring to the accompanying drawings, the present disclosure provides a camera optical lens 10. FIG. 1 shows the camera optical lens 10 of the first embodiment of the present disclosure, and the camera optical lens 10 includes three lenses. Specifically, left side is an object side, right side is an image side, and the camera optical lens 10 includes, from the object side to the image side: a first lens L1, an aperture S1, a second lens L2, and a third lens L3.

In this embodiment, the first lens L1 has a positive refractive power, the second lens L2 has a negative refractive power, the third lens L3 has a positive refractive power.

In this embodiment, the first lens L1, the second lens L2, and the third lens L3 are all made of plastic material. In other embodiments, the lenses may also be made of other materials.

In this embodiment, a focal length of the camera optical lens 10 is defined as f, and a focal length of the first lens L1 is defined as f1. The camera optical lens 10 satisfies a condition of $1.20 \leq f1/f \leq 1.80$, which specifies a ratio between the focal length f1 of the first lens L1 and the focal length f of the camera optical lens 10, effectively balancing spherical aberration and field curvature amount of the camera optical lens 10.

A focal length of the camera optical lens 10 is defined as f, a focal length of the second lens L2 is defined as f2, and the camera optical lens satisfies a condition of $-2.00 \leq f2/f \leq -1.00$, which specifies a ratio between the focal length f2 of the second lens L2 and the focal length f of the camera optical lens 10. In this way, the focal length is distributed appropriately, so that the camera optical lens 10 can attain a better imaging quality and a lower sensitivity.

A focal length of the camera optical lens 10 is defined as f, a focal length of the third lens L3 is defined as f3, and the camera optical lens satisfies a condition of $0.75 \leq f3/f \leq 1.10$, which specifies a ratio between the focal length f3 of the third lens L3 and the focal length f of the camera optical lens 10. In this way, the focal length is distributed appropriately, so that the camera optical lens 10 can attain a better imaging quality and a lower sensitivity.

A central curvature radius of the object-side surface of the first lens L1 is defined as R1, a central curvature radius of the image-side surface of the first lens L1 is defined as R2, and the camera optical lens satisfies a condition of $-6.00 \leq R2/R1 \leq -2.00$, which specifies a shape of the first lens L1. Within this range, the deflection of light passing through the lens can be eased and aberrations can be effectively reduced.

A central curvature radius of the object-side surface of the second lens L2 is defined as R3, a central curvature radius of the image-side surface of the second lens L2 is defined as R4, and the camera optical lens further satisfies a condition of $2.20 \leq R4/R3 \leq 8.00$, which specifies a shape of the second lens L2, within this range, facilitating correcting an on-axis aberration.

An on-axis distance from the image-side surface of the first lens L1 to the object-side surface of the second lens L2 is defined as d2, an on-axis distance from the image-side surface of the second lens L2 to an object-side surface of the third lens L3 is defined as d4, and the camera optical lens further satisfies a condition of $1.50 \leq d2/d4 \leq 3.50$, which specifies a ratio between the on-axis distance d2 from the image-side surface of the first lens L1 to the object-side surface of the second lens L2 and the on-axis distance d4 from the image-side surface of the second lens L2 to an object-side surface of the third lens L3, conducing to compress the total track length and achieve an ultra-thin effect in this range.

A central curvature radius of the object-side surface of the third lens L3 is defined as R5, a central curvature radius of the image-side surface of the third lens L3 is defined as R6, and the camera optical lens 10 further satisfies a condition of $-10.00 \leq (R5+R6)/(R5-R6) \leq -3.00$, which specifies a shape of the third lens L3, facilitating correcting an off-axis aberration.

In an embodiment, an object-side surface of the first lens L1 is convex in the paraxial region, and an image-side surface of the first lens L1 is convex in the paraxial region.

A central curvature radius of the object-side surface of the first lens L1 is defined as R1, a central curvature radius of the image-side surface of the first lens L1 is defined as R2, and the camera optical lens satisfies a condition of $-1.43 \leq (R1+R2)/(R1-R2) \leq -0.22$, which reasonably controls a shape of the first lens L1, so that the first lens L1 can effectively correct spherical aberration of the camera optical lens 10. Preferably, the camera optical lens 10 satisfies a condition of $-0.89 \leq (R1+R2)/(R1-R2) \leq -0.28$.

A total track length of the camera optical lens 10 is defined as TTL, an on-axis thickness of the first lens L1 is defined as d1, and the camera optical lens 10 further satisfies a condition of $0.06 \leq d1/TTL \leq 0.25$, conducing to realize an ultra-thin effect in this range. Preferably, the camera optical lens 10 further satisfies a condition of $0.10 \leq d1/TTL \leq 0.20$.

In this embodiment, an object-side surface of the second lens L2 is concave in the paraxial region, and an image-side surface of the second lens L2 is convex in the paraxial region.

A central curvature radius of the object-side surface of the second lens L2 is defined as R3, a central curvature radius of the image-side surface of the second lens L2 is defined as R4, and the camera optical lens 10 further satisfies a condition of −5.33≤(R3+R4)/(R3−R4)≤−0.86, which specifies a shape of the second lens L2. Within this range, a development towards ultra-thin and wide-angle lenses would facilitate correcting the problem of an on-axis aberration. Preferably, the camera optical lens 10 further satisfies a condition of −3.33≤(R3+R4)/(R3−R4)≤−1.07.

A total track length of the camera optical lens 10 is defined as TTL, an on-axis thickness of the second lens L2 is defined as d3, and the camera optical lens 10 satisfies a condition of 0.04≤d3/TTL≤0.18. Within this range, it is beneficial to achieve ultra-thin lenses. Preferably, the camera optical lens 10 further satisfies a condition of 0.07≤d3/TTL≤0.15.

In this embodiment, an object-side surface of the third lens L3 is convex in the paraxial region, and an image-side surface of the third lens L3 is concave in the paraxial region.

The total track length of the camera optical lens 10 is defined as TTL, an on-axis thickness of the third lens L3 is defined as d5, and the camera optical lens 10 further satisfies a condition of 0.07≤d5/TTL≤0.32. This can facilitate achieving ultra-thin lenses. Preferably, the camera optical lens 10 further satisfies a condition of 0.12≤d5/TTL≤0.25.

In this embodiment, the focal length of the camera optical lens 10 is defined as f, a combined focal length of the first lens L1 and the second lens L2 is defined as f12, and the camera optical lens 10 further satisfies a condition of −112.19≤f12/f≤12.47. Within this range, the aberration and distortion of the imaging optical lens 10 can be eliminated, and the focal length of the imaging optical lens 10 can be suppressed to maintain the miniaturization of the imaging lens system group. Preferably, the camera optical lens 10 further satisfies a condition of −70.12≤f12/f≤9.98.

It can be understood that, in other embodiments, for the first lens L1, the second lens L2, the third lens L3, surface profiles of an object-side surface and an image-side surface respectively may be configured in other convex or concave arrangement.

In this embodiment, a field of view in a diagonal direction of the camera optical lens 10 is defined as FOV, satisfying a condition of FOV≥87.00°, thereby facilitating achieving a wide-angle.

In this embodiment, an image height of the camera optical lens 10 is defined as IH, the total track length of the camera optical lens 10 is defined as TTL, and the camera optical lens 10 further satisfies a condition of TTL/IH≤1.45, thus facilitating to achieve ultra-thin lenses.

When the above condition is satisfied, the camera optical lens 10 can meet the design requirements of wide-angle and ultra-thin in the case that a good optical performance is maintained. According to characteristics of the camera optical lens 10, the camera optical lens 10 is particularly suitable for mobile phone camera lens components and WEB camera lenses composed of camera elements such as CCD and CMOS with high pixel.

In the following, examples will be used to describe the camera optical lens 10 of the present disclosure. The symbols recorded in each example will be described as follows. The focal length, on-axis distance, central curvature radius, on-axis thickness, inflexion point position, and arrest point position are all in units of mm.

TTL refers to a total track length (an on-axis distance from an object-side surface of the first lens L1 to an image surface Si) in units of mm.

Aperture value FNO refers to a ratio of an effective focal length of the camera optical lens to an entrance pupil diameter.

Preferably, inflexion points and/or arrest points can be arranged on the object-side surface and/or the image-side surface of the lens, so as to satisfy the demand for high quality imaging. The description below may be referred for specific implementations.

The design data of the camera optical lens 10 in the first embodiment of the present disclosure are shown in Table 1 and Table 2.

TABLE 1

|  | R | d |  | nd |  | vd |
| --- | --- | --- | --- | --- | --- | --- |
| S1 | ∞ | d0 = | −0.340 |  |  |  |
| R1 | 1.738 | d1 = | 0.326 | nd1 | 1.5444 | v1 | 55.82 |
| R2 | −6.194 | d2 = | 0.412 |  |  |  |
| R3 | −0.909 | d3 = | 0.276 | nd2 | 1.5444 | v2 | 55.82 |
| R4 | −2.567 | d4 = | 0.149 |  |  |  |
| R5 | 0.464 | d5 = | 0.365 | nd3 | 1.5444 | v3 | 55.82 |
| R6 | 0.672 | d6 = | 0.950 |  |  |  |

In the table, meanings of various symbols will be described as follows:

S1: aperture;

R: curvature radius at a center of an optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

d: on-axis thickness of a lens, or an on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the image surface Si;

nd: refractive index of a d line;

nd1: refractive index of the d line of the first lens L1;

nd2: refractive index of the d line of the second lens L2;

nd3: refractive index of the d line of the third lens L3;

vd: abbe number;

v1: abbe number of the first lens L1;

v2: abbe number of the second lens L2;

v3: abbe number of the third lens L3.

Table 2 shows aspherical surface data of the camera optical lens 10 in the first embodiment of the present disclosure.

TABLE 2

| | Conic coefficient | Aspheric surface coefficients | | | | |
|---|---|---|---|---|---|---|
| | k | A4 | A6 | A8 | A10 | A12 |
| R1 | −2.2340E+01 | 3.0040E−01 | −3.1452E+00 | 2.1153E+01 | −1.4623E+02 | 6.4949E+02 |
| R2 | 1.4656E+01 | −1.9037E−01 | −7.3486E+00 | 1.1777E+02 | −1.0663E+03 | 5.8817E+03 |
| R3 | −1.2769E+00 | −2.8279E+00 | 5.0599E+01 | −9.0817E+02 | 1.0398E+04 | −7.7977E+04 |
| R4 | −1.0094E+01 | −7.9762E+00 | 9.0252E+01 | −8.9293E+02 | 6.1822E+03 | −2.8427E+04 |
| R5 | −6.0898E+00 | −1.3695E+00 | −3.1551E+00 | 1.2645E+01 | −2.6083E+01 | 3.3430E+01 |
| R6 | −2.0213E+00 | −8.5511E−01 | 5.0741E−01 | 1.2697E+00 | −3.7611E+00 | 4.7684E+00 |

| | Conic coefficient | Aspheric surface coefficients | | | |
|---|---|---|---|---|---|
| | k | A14 | A16 | A18 | A20 |
| R1 | −2.2340E+01 | −1.6026E+03 | 1.6198E+03 | 0.0000E+00 | 0.0000E+00 |
| R2 | 1.4656E+01 | −1.9989E+04 | 3.2547E+04 | 0.0000E+00 | 0.0000E+00 |
| R3 | −1.2769E+00 | 3.8083E+05 | −1.1344E+06 | 1.8425E+06 | −1.2404E+06 |
| R4 | −1.0094E+01 | 8.3580E+04 | −1.4733E+05 | 1.3930E+05 | −5.3383E+04 |
| R5 | −6.0898E+00 | −2.7349E+01 | 1.3885E+01 | −3.9882E+00 | 4.9544E−01 |
| R6 | −2.0213E+00 | −3.5119E+00 | 1.5478E+00 | −3.7947E−01 | 3.9889E−02 |

Here, K is a conic coefficient, and A4, A6, A8, A10, A12, A14, A16, A18 and A20 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

Here, x denotes a vertical distance between a point on an aspheric curve and an optical axis, and y denotes a depth of a aspheric surface (i.e. a vertical distance between a point on an aspheric surface that is x away from the optical axis, and a tangent plane tangent to an vertex of the optical axis on the aspheric surface).

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of the camera optical lens 10 according to the first embodiment of the present disclosure. P1R1 and P1R2 respectively represent the object-side surface and the image-side surface of the first lens L1, P2R1 and P2R2 respectively represent the object-side surface and the image-side surface of the second lens L2, P3R1 and P3R2 respectively represent the object-side surface and the image-side surface of the third lens L3. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 |
|---|---|---|---|
| P1R1 | 2 | 0.355 | 0.565 |
| P1R2 | 1 | 0.425 | / |
| P2R1 | 1 | 0.405 | / |
| P2R2 | 1 | 0.485 | / |
| P3R1 | 2 | 0.285 | 0.975 |
| P3R2 | 2 | 0.365 | 1.365 |

TABLE 4

| | Number(s) of arrest points | Arrest point position 1 | Arrest point position 2 |
|---|---|---|---|
| P1R1 | 2 | 0.535 | 0.585 |
| P1R2 | 0 | / | / |

TABLE 4-continued

| | Number(s) of arrest points | Arrest point position 1 | Arrest point position 2 |
|---|---|---|---|
| P2R1 | 0 | / | / |
| P2R2 | 0 | / | / |
| P3R1 | 1 | 0.685 | / |
| P3R2 | 1 | 0.825 | / |

Figure 2:
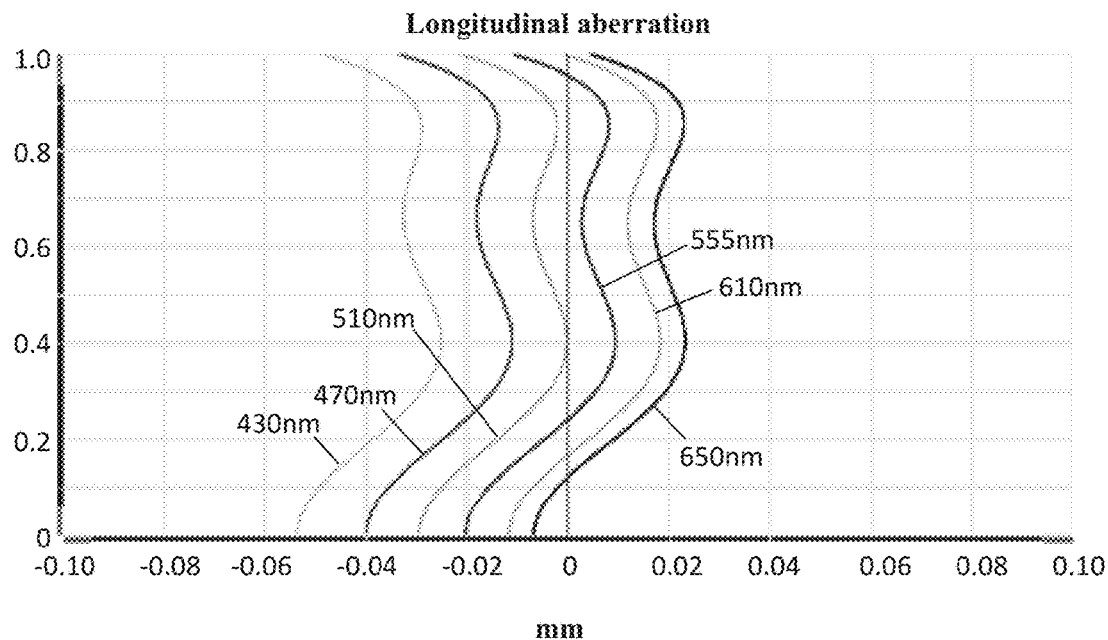
FIG. 2 is a schematic diagram of a longitudinal aberration of the camera optical lens shown in FIG. 1.
Figure 3:
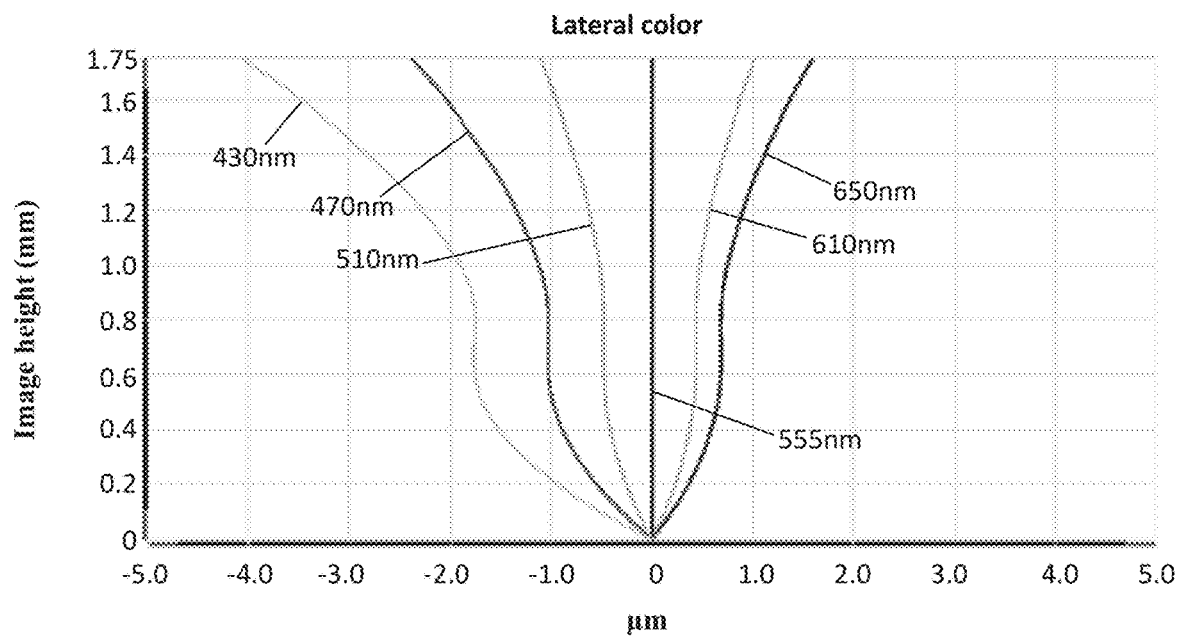
FIG. 3 is a schematic diagram of a lateral color of the camera optical lens shown in FIG. 1.
Figure 4:
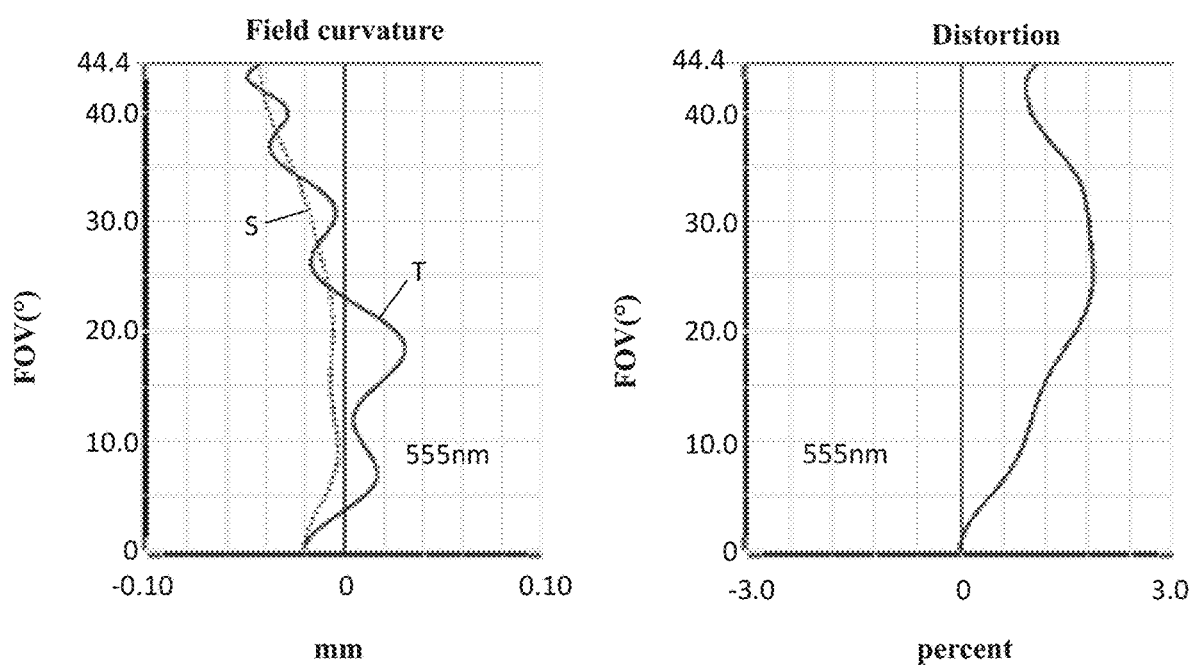
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 650 nm, 610 nm, 555 nm, 510 nm, 470 nm and 430 nm after passing the camera optical lens 10 according to the first embodiment, respectively. FIG. 4 illustrates a field curvature and a distortion of light with a wavelength of 555 nm after passing the camera optical lens 10 according to the first embodiment. In FIG. 4, a field curvature S is a field curvature in a sagittal direction, and T is a field curvature in a meridional direction.

Table 21 in the following shows various values of first, second, third, fourth and fifth embodiments and values corresponding to parameters which are specified in the above conditions.

As shown in Table 21, the first embodiment satisfies the above conditions.

In this Embodiment, an entrance pupil diameter (ENPD) of the camera optical lens is 0.723 mm, an image height (IH) of 1.0H is 1.750 mm, a field of view (FOV) in a diagonal direction is 88.80°. Thus, the camera optical lens meets the design requirements of wide-angle and ultra-thin. Its on-axis and off-axis aberrations are fully corrected, thereby achieving excellent optical characteristics.

Second Embodiment

Figure 5:
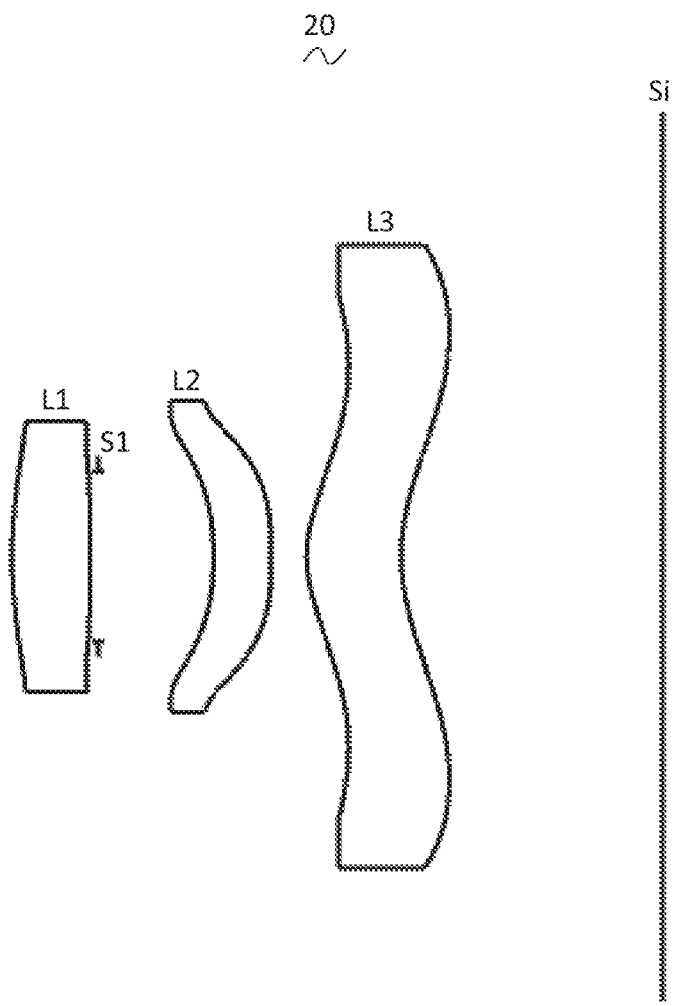
FIG. 5 is a schematic diagram of a structure of a camera optical lens according to a second embodiment of the present disclosure.

FIG. 5 shows a camera optical lens 20 of the second embodiment of the present disclosure, the second embodiment is basically the same as the first embodiment and involves symbols having the same meanings as the first embodiment, and only differences therebetween will be described in the following.

Table 5 and Table 6 show design data of the camera optical lens 20 in the second embodiment of the present disclosure.

TABLE 5

|    | R       | d         | nd   |        | vd |       |
|----|---------|-----------|------|--------|----|-------|
| S1 | ∞       | d0 = -0.329 |      |        |    |       |
| R1 | 1.964   | d1 = 0.299  | nd1  | 1.5444 | v1 | 55.82 |
| R2 | -11.567 | d2 = 0.470  |      |        |    |       |
| R3 | -1.241  | d3 = 0.220  | nd2  | 1.5444 | v2 | 55.82 |
| R4 | -4.514  | d4 = 0.135  |      |        |    |       |
| R5 | 0.489   | d5 = 0.362  | nd3  | 1.5444 | v3 | 55.82 |
| R6 | 0.831   | d6 = 0.997  |      |        |    |       |

Table 6 shows aspherical surface data of each lens of the camera optical lens 20 in the second embodiment of the present disclosure.

TABLE 6

| | Conic coefficient | Aspheric surface coefficients | | | | |
|---|---|---|---|---|---|---|
| | k | A4 | A6 | A8 | A10 | A12 |
| R1 | -8.1787E+01 | 9.1603E-01 | -5.8065E+00 | 5.3562E+00 | 1.7469E+02 | -1.3202E+03 |
| R2 | 9.9000E+01 | -3.7729E-01 | 5.0514E+00 | -1.0481E+02 | 1.3927E+03 | -1.1123E+04 |
| R3 | 4.9725E-01 | -3.0438E+00 | 4.8216E+01 | -6.1605E+02 | 5.2509E+03 | -3.0582E+04 |
| R4 | 1.3817E+01 | -7.9012E+00 | 8.0986E+01 | -6.9521E+02 | 4.2219E+03 | -1.7279E+04 |
| R5 | -6.6112E+00 | -1.6189E-01 | -7.5443E-01 | 2.1244E+00 | -3.1311E+00 | 3.0330E+00 |
| R6 | -1.2790E+00 | -6.5343E-01 | 2.9338E-01 | 3.2580E-01 | -7.7118E-01 | 6.7075E-01 |
| | Conic coefficient | Aspheric surface coefficients | | | | |
| | k | A14 | A16 | A18 | A20 | |
| R1 | -8.1787E+01 | 4.4251E+03 | -7.3504E+03 | 4.8625E+03 | 0.0000E+00 | |
| R2 | 9.9000E+01 | 5.1865E+04 | -1.3200E+05 | 1.4278E+05 | 0.0000E+00 | |
| R3 | 4.9725E-01 | 1.1948E+05 | -2.8989E+05 | 3.8859E+05 | -2.1911E+05 | |
| R4 | 1.3817E+01 | 4.5109E+04 | -6.9010E+04 | 5.4097E+04 | -1.5709E+04 | |
| R5 | -6.6112E+00 | -1.9565E+00 | 8.0540E-01 | -1.9028E-01 | 1.9538E-02 | |
| R6 | -1.2790E+00 | -2.9837E-01 | 5.7644E-02 | 1.5768E-03 | -1.6024E-03 | |

Table 7 and table 8 show design data of inflexion points and arrest points of each lens of the camera optical lens 20 lens according to the second embodiment of the present disclosure.

TABLE 7

|      | Number(s) of inflexion points | Inflexion point position 1 |
|------|-------------------------------|----------------------------|
| P1R1 | 1 | 0.415 |
| P1R2 | 0 | / |
| P2R1 | 1 | 0.435 |
| P2R2 | 1 | 0.505 |
| P3R1 | 1 | 0.325 |
| P3R2 | 1 | 0.435 |

TABLE 8

|      | Number of arrest points | Arrest point position 1 |
|------|-------------------------|-------------------------|
| P1R1 | 0 | / |
| P1R2 | 0 | / |
| P2R1 | 0 | / |
| P2R2 | 0 | / |
| P3R1 | 1 | 0.765 |
| P3R2 | 1 | 0.895 |

Figure 6:
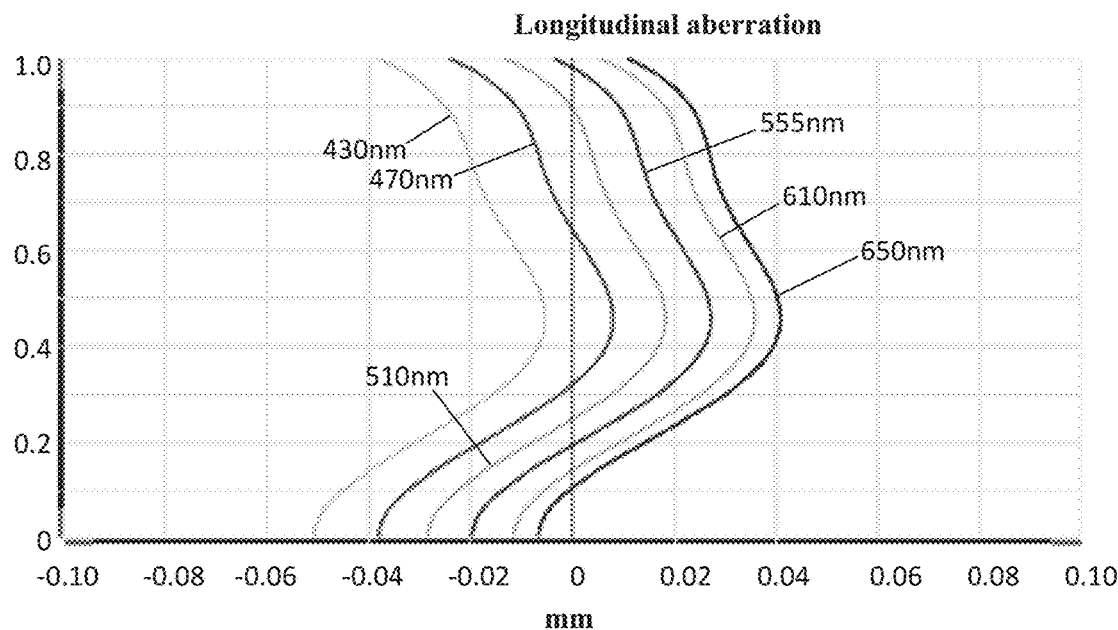
FIG. 6 is a schematic diagram of a longitudinal aberration of the camera optical lens shown in FIG. 5.
Figure 7:
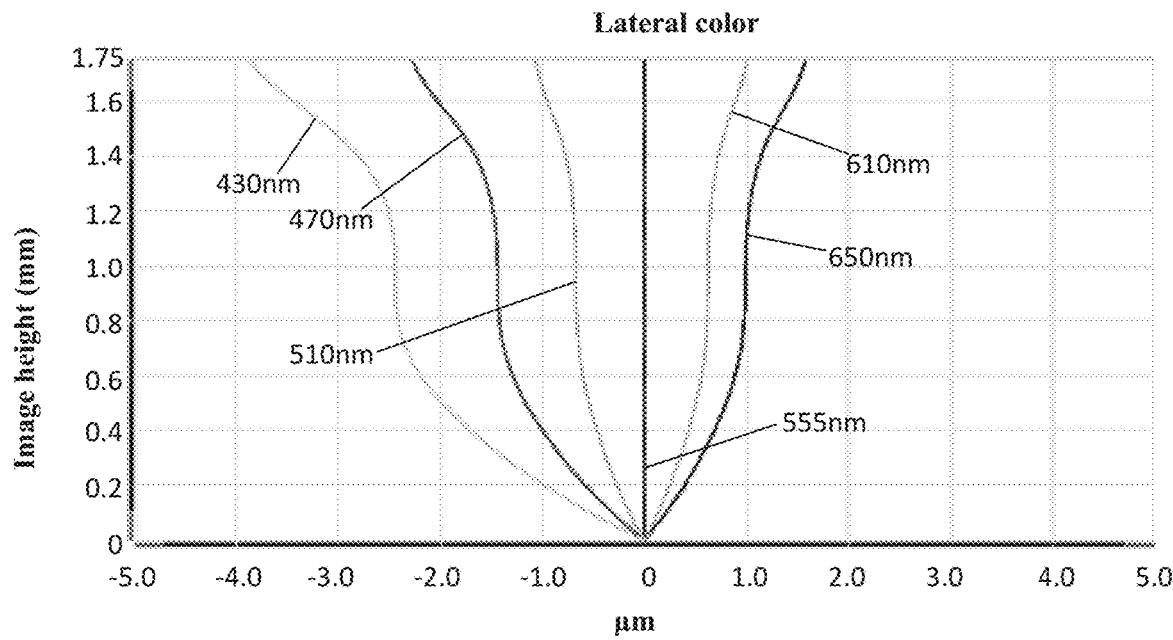
FIG. 7 is a schematic diagram of a lateral color of the camera optical lens shown in FIG. 5.
Figure 8:
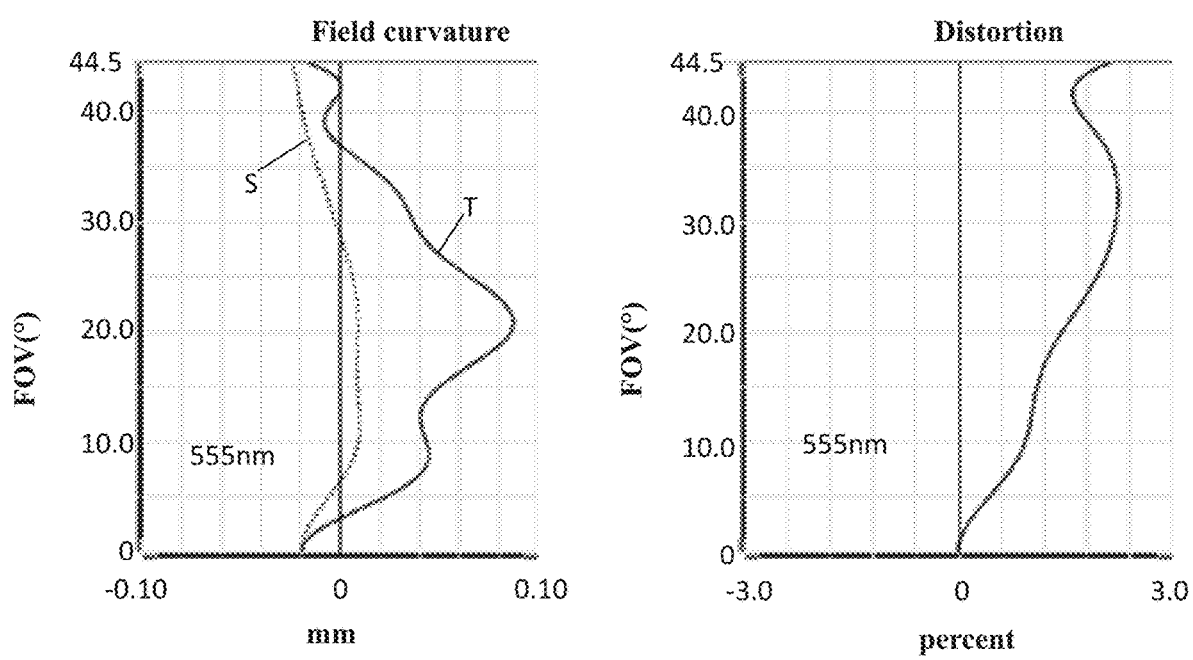
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm, 470 nm and 430 nm after passing the camera optical lens 20 according to the second embodiment. FIG. 8 illustrates a field curvature and a distortion of light with a wavelength of 555 nm after passing the camera optical lens 20 according to the second embodiment. A field curvature S in FIG. 8 is a field curvature in a sagittal direction, and T is a field curvature in a meridian direction.

As shown in Table 21, the second embodiment satisfies the above conditions.

In this embodiment, an entrance pupil diameter (ENPD) of the camera optical lens 20 is 0.713 mm, an image height (IH) of 1.0H is 1.750 mm, a field of view (FOV) in a diagonal direction is 89.00°. Thus, the camera optical lens 20 meets the design requirements of wide-angle and ultra-thin. Its on-axis and off-axis aberrations are fully corrected, thereby achieving excellent optical characteristics.

Third Embodiment

Figure 9:
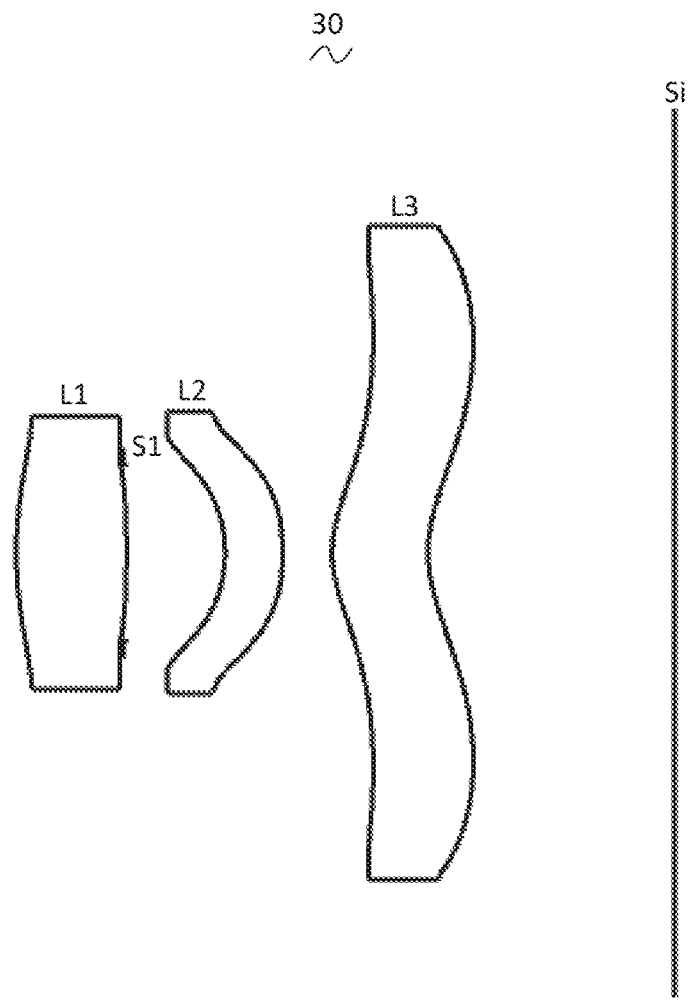
FIG. 9 is a schematic diagram of a structure of a camera optical lens according to a third embodiment of the present disclosure.

FIG. 9 shows a camera optical lens 30 of the third embodiment of the present disclosure, the third embodiment is basically the same as the first embodiment and involves symbols having the same meanings as the first embodiment, and only differences therebetween will be described in the following.

Table 9 and Table 10 show design data of the camera optical lens 30 in the embodiment of the present disclosure.

TABLE 9

|    | R      | d           | nd  |        | vd |       |
|----|--------|-------------|-----|--------|----|-------|
| S1 | ∞      | d0 = -0.408 |     |        |    |       |
| R1 | 1.648  | d1 = 0.421  | nd1 | 1.5444 | v1 | 55.82 |
| R2 | -4.014 | d2 = 0.379  |     |        |    |       |
| R3 | -0.558 | d3 = 0.219  | nd2 | 1.5444 | v2 | 55.82 |
| R4 | -1.228 | d4 = 0.189  |     |        |    |       |
| R5 | 0.422  | d5 = 0.368  | nd3 | 1.5444 | v3 | 55.82 |
| R6 | 0.540  | d6 = 0.945  |     |        |    |       |

Table 10 shows aspherical surface data of each lens of the camera optical lens 30 in the third embodiment of the present disclosure.

TABLE 10

| | Conic coefficient | Aspheric surface coefficients | | | | |
|---|---|---|---|---|---|---|
| | k | A4 | A6 | A8 | A10 | A12 |
| R1 | −2.5284E+01 | 8.8140E−01 | −1.3388E+01 | 1.3413E+02 | −8.4444E+02 | 3.0459E+03 |
| R2 | 1.6513E+01 | 1.4779E+00 | −7.7263E+01 | 1.6155E+03 | −1.9742E+04 | 1.4055E+05 |
| R3 | −1.0829E+00 | −1.0528E+00 | −5.8863E+01 | 1.4904E+03 | −1.8875E+04 | 1.3036E+05 |
| R4 | −7.2999E+00 | −9.8800E+00 | 1.1397E+02 | −1.1256E+03 | 7.9215E+03 | −3.7950E+04 |
| R5 | −6.2209E+00 | −4.0409E+00 | −1.3323E+00 | 8.0393E+00 | −1.8999E+01 | 2.5984E+01 |
| R6 | −4.1490E+00 | −7.7526E−01 | 1.6103E+00 | −3.1228E+00 | 4.9570E+00 | −5.7506E+00 |

| | Conic coefficient | Aspheric surface coefficients | | | |
|---|---|---|---|---|---|
| | k | A14 | A16 | A18 | A20 |
| R1 | −2.5284E+01 | −5.8814E+03 | 4.7126E+03 | 0.0000E+00 | 0.0000E+00 |
| R2 | 1.6513E+01 | −5.4006E+05 | 8.6623E+05 | 0.0000E+00 | 0.0000E+00 |
| R3 | −1.0829E+00 | −4.7758E+05 | 8.5826E+05 | −5.7532E+05 | 0.0000E+00 |
| R4 | −7.2999E+00 | 1.1655E+05 | −2.0010E+05 | 1.4323E+05 | 0.0000E+00 |
| R5 | −6.2209E+00 | −2.1873E+01 | 1.1145E+01 | −3.1483E+00 | 3.7809E−01 |
| R6 | −4.1490E+00 | 4.4704E+00 | −2.1648E+00 | 5.8458E−01 | −6.6815E−02 |

Table 11 and Table 12 show design data inflexion points and arrest points of the respective lenses in the camera optical lens 30 according to the third embodiment of the present disclosure.

TABLE 11

| | Number(s) of inflexion points | Inflexion point position 1 | Inflexion point position 2 |
|---|---|---|---|
| P1R1 | 1 | 0.375 | / |
| P1R2 | 0 | / | / |
| P2R1 | 1 | 0.375 | / |
| P2R2 | 1 | 0.445 | / |
| P3R1 | 2 | 0.275 | 1.105 |
| P3R2 | 2 | 0.325 | 1.305 |

TABLE 12

| | Number of arrest points | Arrest point position 1 | Arrest point position 2 |
|---|---|---|---|
| P1R1 | 1 | 0.545 | / |
| P1R2 | 0 | / | / |
| P2R1 | 0 | / | / |
| P2R2 | 0 | / | / |
| P3R1 | 2 | 0.855 | 1.245 |
| P3R2 | 1 | 0.835 | / |

Figure 10:
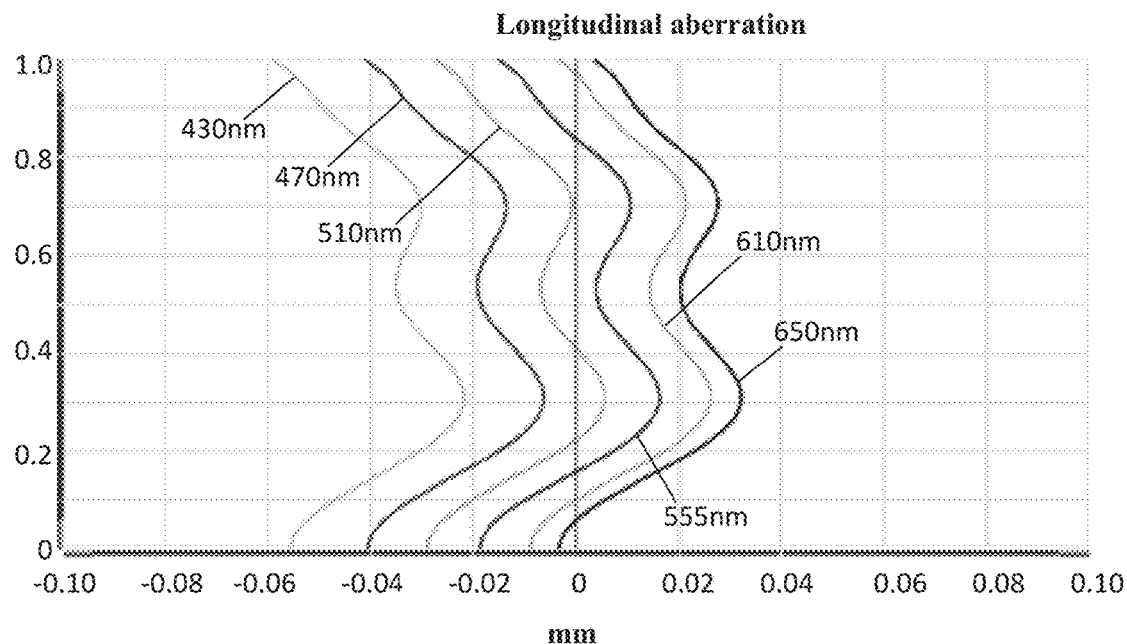
FIG. 10 is a schematic diagram of a longitudinal aberration of the camera optical lens shown in FIG. 9.
Figure 11:
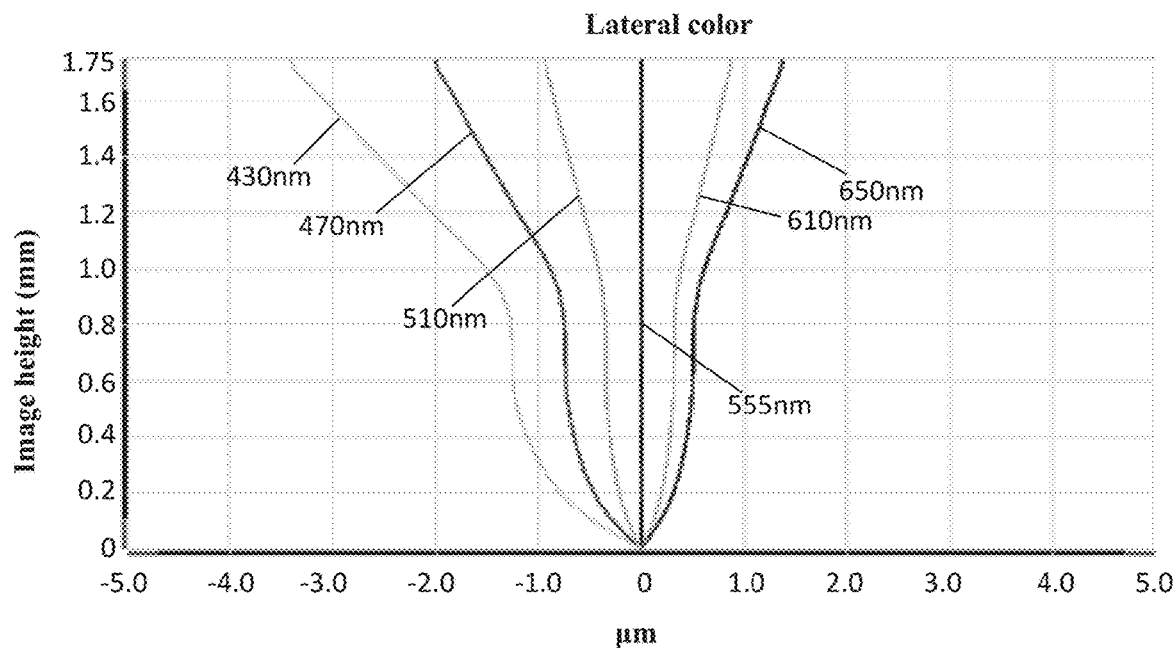
FIG. 11 is a schematic diagram of a lateral color of the camera optical lens shown in FIG. 9.
Figure 12:
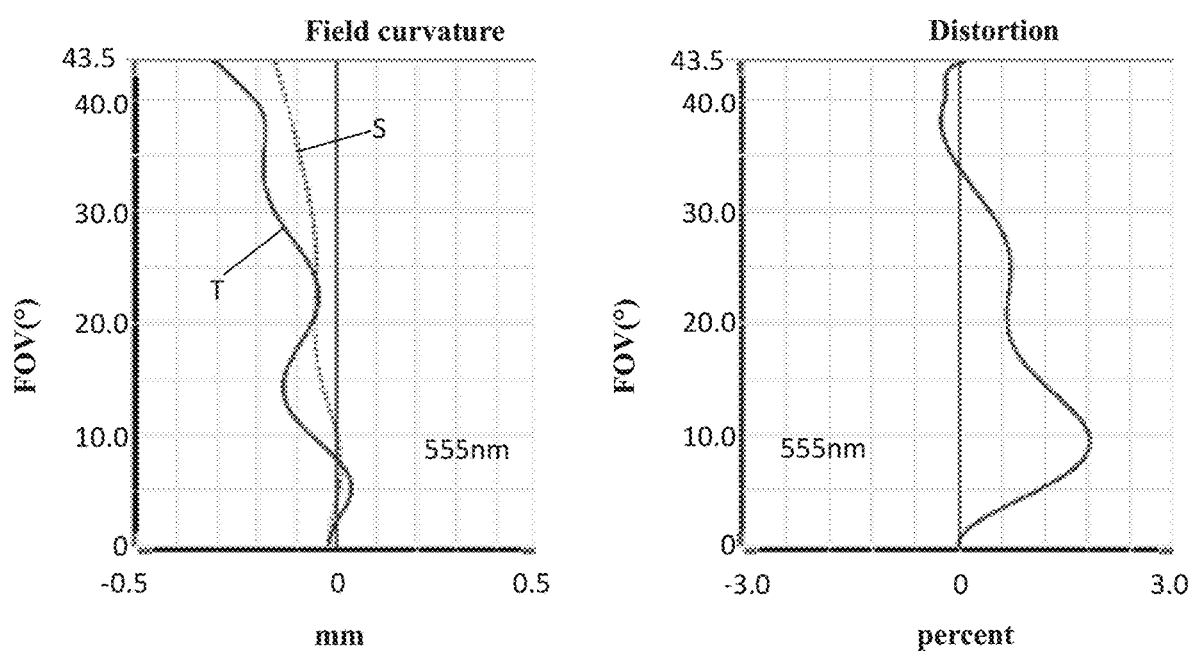
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm, 470 nm and 430 nm after passing the camera optical lens 30 according to the third embodiment, respectively. FIG. 12 illustrates a field curvature and a distortion of light with a wavelength of 555 nm after passing the camera optical lens 30 according to the third embodiment. In FIG. 12, a field curvature S is a field curvature in a sagittal direction, and T is a field curvature in a meridional direction.

As shown in Table 21, the third embodiment satisfies the above conditions.

In this embodiment, an entrance pupil diameter (ENPD) of the camera optical lens 30 is 0.753 mm, an image height (IH) of 1.0H is 1.750 mm, a field of view (FOV) in a diagonal direction is 87.00°. Thus, the camera optical lens 30 meets the design requirements of wide-angle and ultra-thin. Its on-axis and off-axis aberrations are fully corrected, thereby achieving excellent optical characteristics.

Fourth Embodiment

Figure 13:
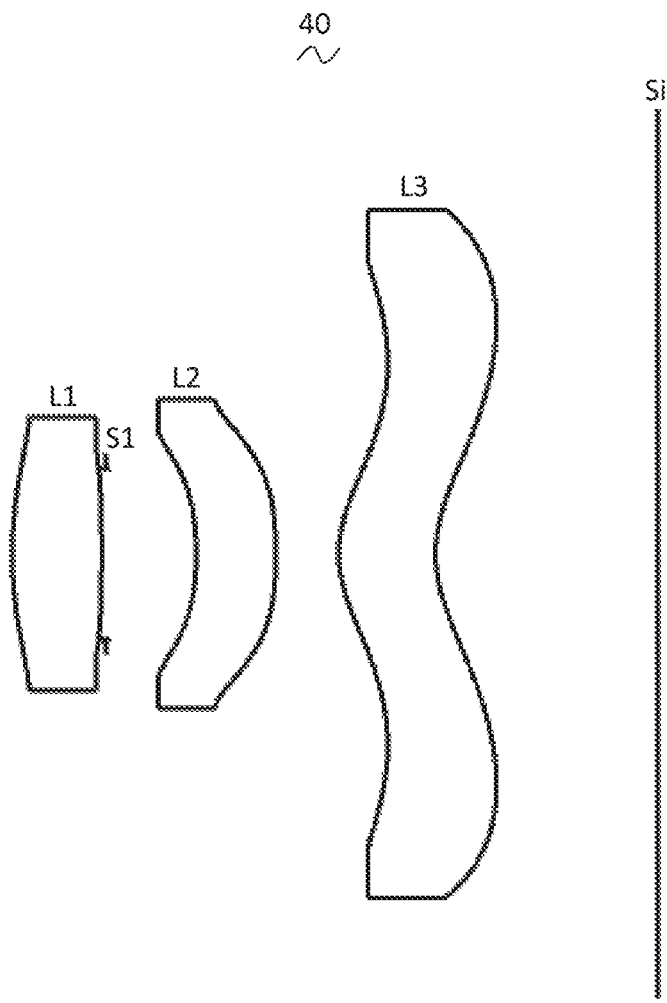
FIG. 13 is a schematic diagram of a structure of a camera optical lens according to a fourth embodiment of the present disclosure.

FIG. 13 shows a camera optical lens 40 of the fourth embodiment of the present disclosure, the fourth embodiment is basically the same as the first embodiment and involves symbols having the same meanings as the first embodiment, and only differences therebetween will be described in the following.

Table 13 and Table 14 show design data of the camera optical lens 40 in the embodiment of the present disclosure.

TABLE 13

| | R | d | | nd | | vd | |
|---|---|---|---|---|---|---|---|
| S1 | ∞ | d0 = | −0.355 | | | | |
| R1 | 1.631 | d1 = | 0.340 | nd1 | 1.5444 | v1 | 55.82 |
| R2 | −9.783 | d2 = | 0.361 | | | | |
| R3 | −1.247 | d3 = | 0.302 | nd2 | 1.5444 | v2 | 55.82 |
| R4 | −3.939 | d4 = | 0.240 | | | | |
| R5 | 0.442 | d5 = | 0.370 | nd3 | 1.5444 | v3 | 55.82 |
| R6 | 0.541 | d6 = | 0.848 | | | | |

Table 14 shows aspherical surface data of each lens of the camera optical lens 40 in the fourth embodiment of the present disclosure.

TABLE 14

| | Conic coefficient | Aspheric surface coefficients | | | | |
|---|---|---|---|---|---|---|
| | k | A4 | A6 | A8 | A10 | A12 |
| R1 | −2.5235E−01 | 7.5841E−02 | −4.6561E+00 | 3.7100E+01 | −1.9488E+02 | 6.1333E+02 |
| R2 | 3.0039E+02 | −5.3448E−01 | 1.8920E+00 | 2.9824E+01 | −8.0255E+02 | 6.7747E+03 |
| R3 | 1.2833E+00 | −3.8021E+00 | 6.1493E+01 | −9.4166E+02 | 1.0308E+04 | −7.7555E+04 |

TABLE 14-continued

| | | | | | |
|---|---|---|---|---|---|
| R4 | −1.0000E+03 | −8.3152E+00 | 9.2106E+01 | −8.9354E+02 | 6.1741E+03 | −2.8440E+04 |
| R5 | −3.9549E+00 | −1.4023E−01 | −3.1846E+00 | 1.2638E+01 | −2.6085E+01 | 3.3430E+01 |
| R6 | −2.2862E+00 | −7.9904E−01 | 5.0586E−01 | 1.2649E+00 | −3.7646E+00 | 4.7674E+00 |

| | Conic coefficient | Aspheric surface coefficients | | | |
|---|---|---|---|---|---|
| | k | A14 | A16 | A18 | A20 |
| R1 | −2.5235E−01 | −1.1336E+03 | 9.5219E+02 | 0.0000E+00 | 0.0000E+00 |
| R2 | 3.0039E+02 | −2.6082E+04 | 3.9635E+04 | 0.0000E+00 | 0.0000E+00 |
| R3 | 1.2833E+00 | 3.8253E+05 | −1.1386E+06 | 1.8009E+06 | −1.1140E+06 |
| R4 | −1.0000E+03 | 8.3575E+04 | −1.4730E+05 | 1.3935E+05 | −5.3016E+04 |
| R5 | −3.9549E+00 | −2.7347E+01 | 1.3887E+01 | −3.9875E+00 | 4.9464E−01 |
| R6 | −2.2862E+00 | −3.5117E+00 | 1.5481E+00 | −3.7938E−01 | 3.9824E−02 |

Table 15 and Table 16 show design data inflexion points and arrest points of the respective lenses in the camera optical lens 40 according to the fourth embodiment of the present disclosure.

TABLE 15

| | Number(s) of inflexion points | Inflexion point position 1 | Inflexion point position 2 |
|---|---|---|---|
| P1R1 | 1 | 0.385 | / |
| P1R2 | 0 | / | / |
| P2R1 | 1 | 0.415 | / |
| P2R2 | 1 | 0.505 | / |
| P3R1 | 2 | 0.315 | 1.135 |
| P3R2 | 2 | 0.375 | 1.385 |

TABLE 16

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 1 | 0.755 |
| P3R2 | 1 | 0.915 |

Figure 14:
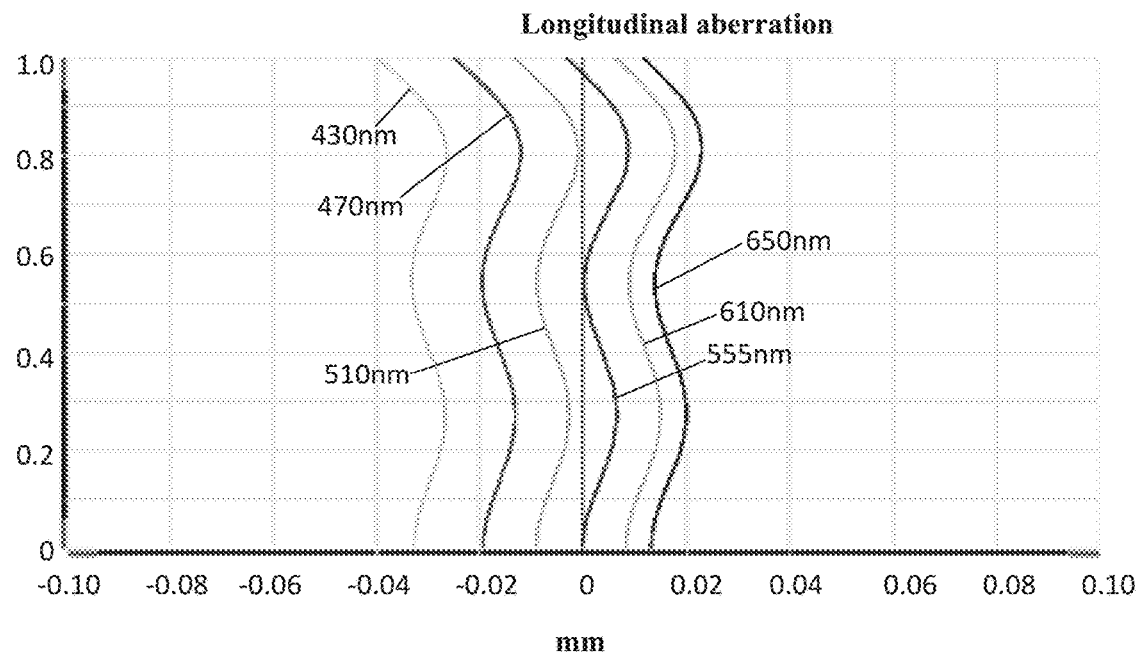
FIG. 14 is a schematic diagram of a longitudinal aberration of the camera optical lens shown in FIG. 13.
Figure 15:
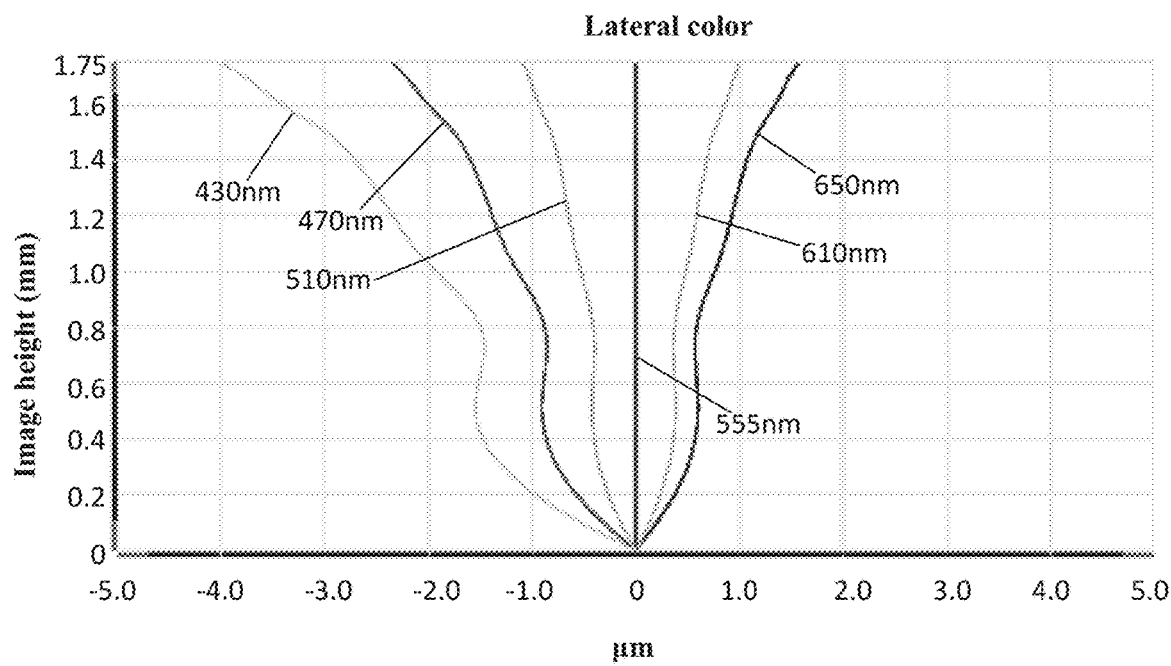
FIG. 15 is a schematic diagram of a lateral color of the camera optical lens shown in FIG. 13.
Figure 16:
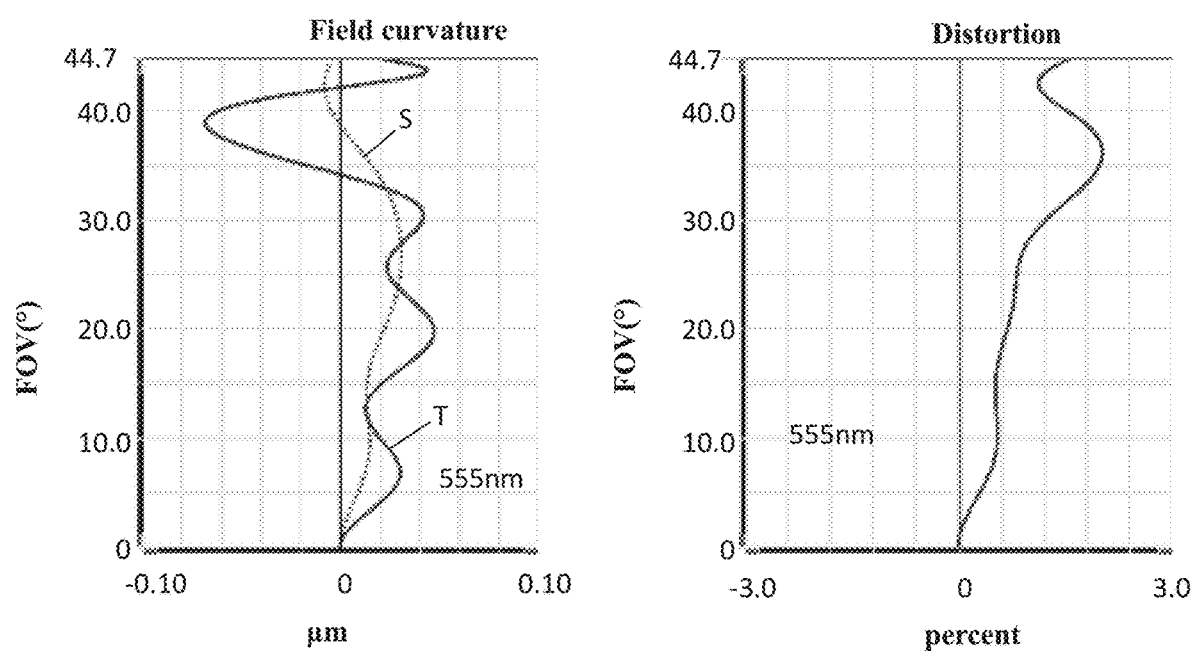
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 650 nm, 610 nm, 555 nm, 510 nm, 470 nm and 430 nm after passing the camera optical lens 40 according to the fourth embodiment, respectively. FIG. 16 illustrates a field curvature and a distortion of light with a wavelength of 555 nm after passing the camera optical lens 40 according to the fourth embodiment. In FIG. 16, a field curvature S is a field curvature in a sagittal direction, and T is a field curvature in a meridional direction.

As shown in Table 21, the fourth embodiment satisfies the above conditions.

In this embodiment, an entrance pupil diameter (ENPD) of the camera optical lens 40 is 0.718 mm, an image height (IH) of 1.0H is 1.750 mm, a field of view (FOV) in a diagonal direction is 89.40°. Thus, the camera optical lens 40 meets the design requirements of wide-angle and ultra-thin. Its on-axis and off-axis aberrations are fully corrected, thereby achieving excellent optical characteristics.

Fifth Embodiment

Figure 17:
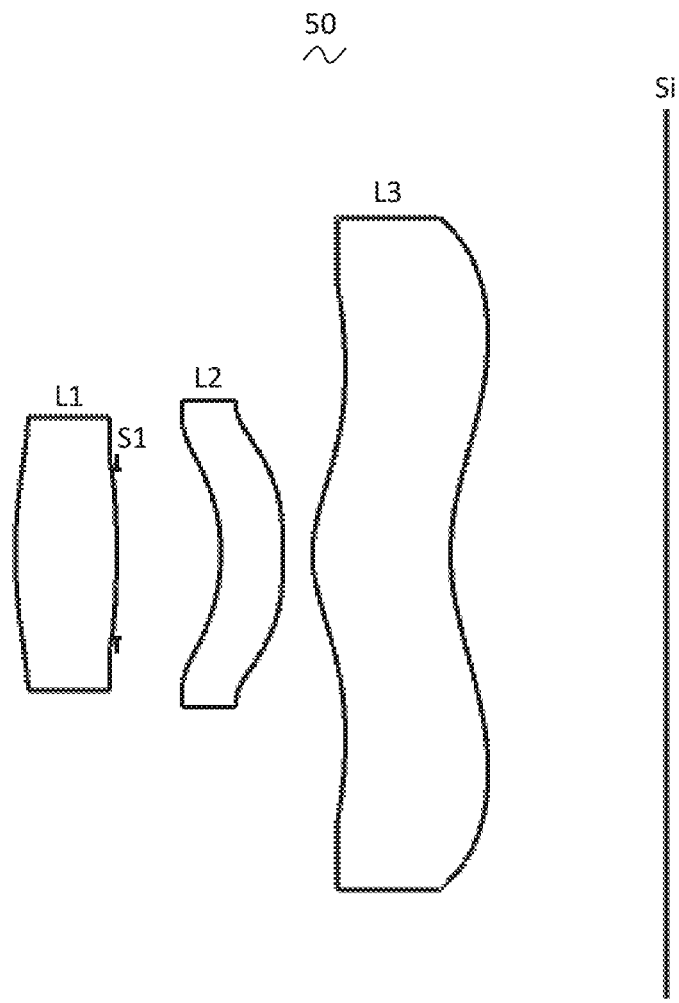
FIG. 17 is a schematic diagram of a structure of a camera optical lens according to a fifth embodiment of the present disclosure.

FIG. 17 shows a camera optical lens 50 of the fifth embodiment of the present disclosure, the fifth embodiment is basically the same as the first embodiment and involves symbols having the same meanings as the first embodiment, and only differences therebetween will be described in the following.

Table 17 and Table 18 show design data of the camera optical lens 50 in the fifth embodiment of the present disclosure.

TABLE 17

| | R | d | | nd | | vd |
|---|---|---|---|---|---|---|
| S1 | ∞ | d0 = | −0.387 | | | |
| R1 | 1.851 | d1 = | 0.387 | nd1 | 1.5444 | v1 | 55.82 |
| R2 | −3.719 | d2 = | 0.396 | | | |
| R3 | −0.816 | d3 = | 0.235 | nd2 | 1.5444 | v2 | 55.82 |
| R4 | −6.520 | d4 = | 0.114 | | | |
| R5 | 0.487 | d5 = | 0.526 | nd3 | 1.5444 | v3 | 55.82 |
| R6 | 0.972 | d6 = | 0.822 | | | |

Table 18 shows aspherical surface data of each lens of the camera optical lens 50 in the fifth embodiment of the present disclosure.

TABLE 18

| | Conic coefficient | Aspheric surface coefficients | | | | |
|---|---|---|---|---|---|---|
| | k | A4 | A6 | A8 | A10 | A12 |
| R1 | −1.9117E+01 | 2.4402E−01 | −3.0854E+00 | 2.2643E+01 | −1.5682E+02 | 6.8645E+02 |
| R2 | 5.9485E+01 | −8.6850E−02 | −2.5844E+00 | 5.4345E+01 | −7.3964E+02 | 6.4922E+03 |
| R3 | −1.9008E+01 | −4.5560E+00 | 5.6844E+01 | −8.8965E+02 | 1.0344E+04 | −7.8283E+04 |
| R4 | 2.7304E+01 | −8.0612E+00 | 9.1361E+01 | −8.9452E+02 | 6.1966E+03 | −2.8405E+04 |
| R5 | −8.8844E+00 | −1.6635E−02 | −3.1504E+00 | 1.2561E+01 | −2.6082E+01 | 3.3444E+01 |
| R6 | −8.2602E−01 | −7.0676E−01 | 1.3920E−01 | 1.5014E+00 | −3.7869E+00 | 4.7469E+00 |

TABLE 18-continued

| | Conic coefficient | Aspheric surface coefficients | | | |
|---|---|---|---|---|---|
| | k | A14 | A16 | A18 | A20 |
| R1 | −1.9117E+01 | −1.6451E+03 | 1.6053E+03 | 0.0000E+00 | 0.0000E+00 |
| R2 | 5.9485E+01 | −3.1434E+04 | 6.4035E+04 | 0.0000E+00 | 0.0000E+00 |
| R3 | −1.9008E+01 | 3.8051E+05 | −1.1317E+06 | 1.8575E+06 | −1.2818E+06 |
| R4 | 2.7304E+01 | 8.3518E+04 | −1.4767E+05 | 1.3876E+05 | −5.0848E+04 |
| R5 | −8.8844E+00 | −2.7341E+01 | 1.3886E+01 | −3.9893E+00 | 4.9468E−01 |
| R6 | −8.2602E−01 | −3.5133E+00 | 1.5500E+00 | −3.7873E−01 | 3.9654E−02 |

Table 19 and Table 20 show design data inflexion points and arrest points of the respective lenses in the camera optical lens 50 according to the fifth embodiment of the present disclosure.

TABLE 19

| | Number(s) of inflexion points | Inflexion point position 1 | Inflexion point position 2 |
|---|---|---|---|
| P1R1 | 1 | 0.365 | / |
| P1R2 | 0 | / | / |
| P2R1 | 1 | 0.385 | / |
| P2R2 | 1 | 0.455 | / |
| P3R1 | 2 | 0.275 | 1.045 |
| P3R2 | 2 | 0.405 | 1.385 |

TABLE 20

| | Number of arrest points | Arrest point position 1 | Arrest point position 2 |
|---|---|---|---|
| P1R1 | 1 | 0.545 | / |
| P1R2 | 0 | / | / |
| P2R1 | 0 | / | / |
| P2R2 | 1 | 0.595 | / |
| P3R1 | 2 | 0.735 | 1.205 |
| P3R2 | 1 | 0.865 | / |

Figure 18:
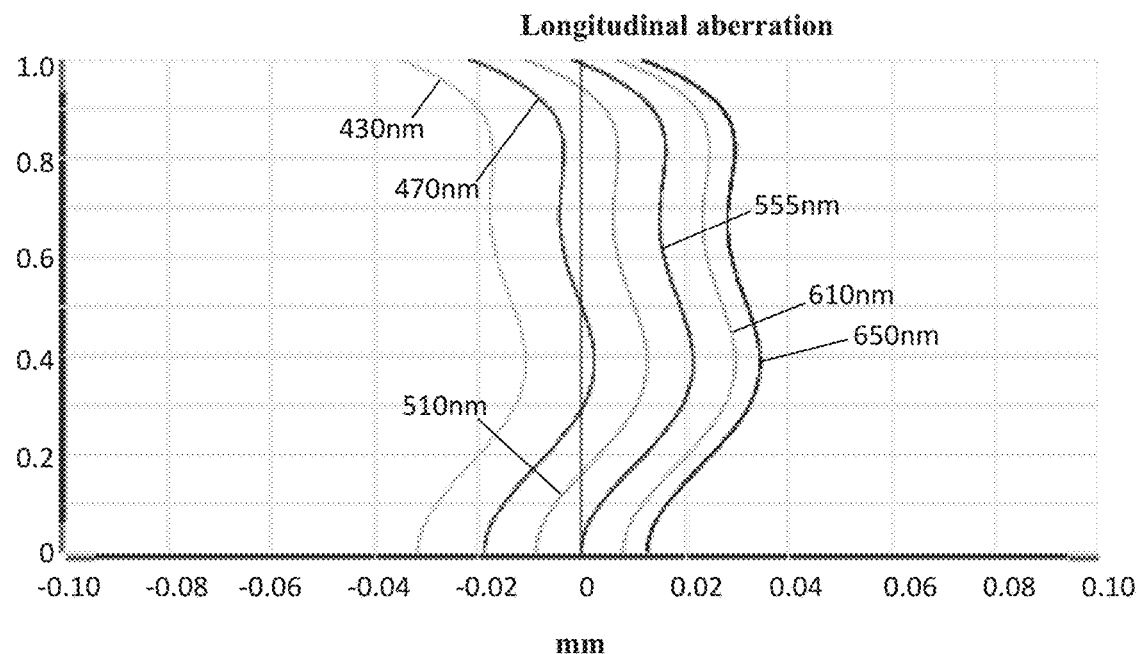
FIG. 18 is a schematic diagram of a longitudinal aberration of the camera optical lens shown in FIG. 17.
Figure 19:
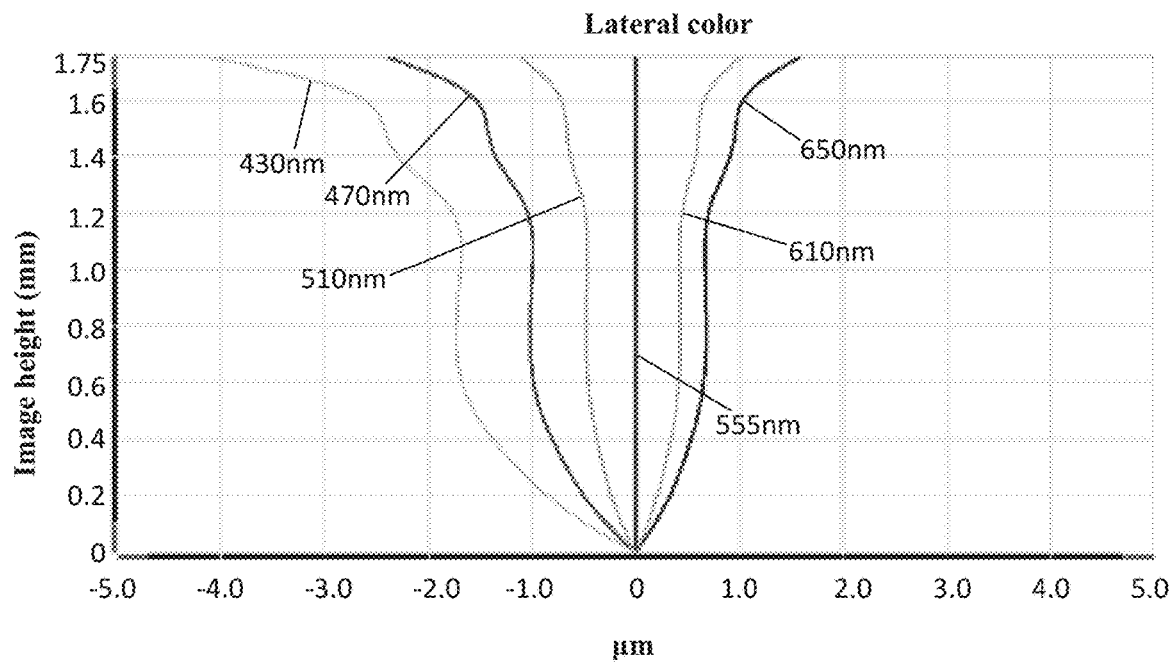
FIG. 19 is a schematic diagram of a lateral color of the camera optical lens shown in FIG. 17.
Figure 20:
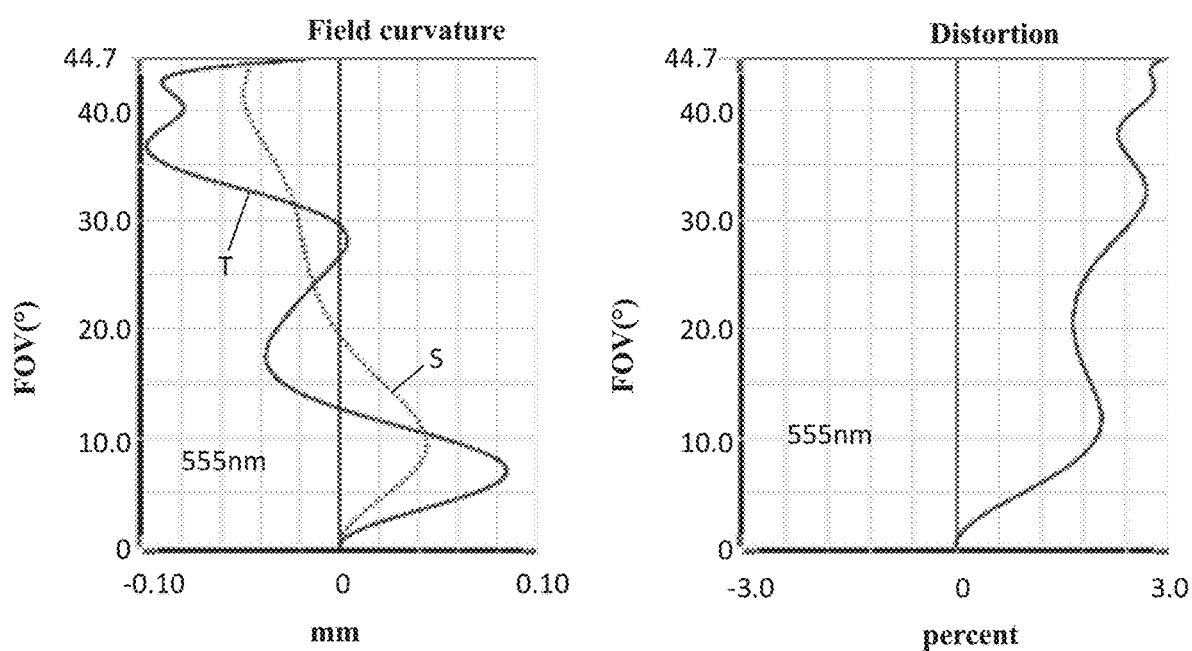
FIG. 20 is a schematic diagram of a field curvature and a distortion of the camera optical lens shown in FIG. 17.

FIG. 18 and FIG. 19 illustrate a longitudinal aberration and a lateral color of light with wavelengths of 650 nm, 610 nm, 555 nm, 510 nm, 470 nm and 430 nm after passing the camera optical lens 50 according to the fifth embodiment, respectively. FIG. 20 illustrates a field curvature and a distortion of light with a wavelength of 555 nm after passing the camera optical lens 50 according to the fifth embodiment. In FIG. 20, a field curvature S is a field curvature in a sagittal direction, and T is a field curvature in a meridional direction.

Table 21 in the following lists values corresponding to the respective conditions in the embodiment according to the above conditions. Obviously, the camera optical lens 50 in the embodiment satisfies the above conditions.

In this embodiment, an entrance pupil diameter (ENPD) of the camera optical lens 50 is 0.710 mm, an image height (IH) of 1.0H is 1.750 mm, a field of view (FOV) in a diagonal direction is 89.40°. Thus, the camera optical lens 50 meets the design requirements of wide-angle and ultra-thin. Its on-axis and off-axis aberrations are fully corrected, thereby achieving excellent optical characteristics.

TABLE 21

| Parameters and conditions | First embodiment | Second embodiment | Third embodiment | Fourth embodiment | Fifth embodiment |
|---|---|---|---|---|---|
| f1/f | 1.44 | 1.79 | 1.20 | 1.49 | 1.35 |
| f2/f | −1.56 | −1.86 | −1.16 | −2.00 | −1.01 |
| f3/f | 0.97 | 0.92 | 0.92 | 1.10 | 0.75 |
| R2/R1 | −3.56 | −5.89 | −2.44 | −6.00 | −2.01 |
| R4/R3 | 2.82 | 3.64 | 2.20 | 3.16 | 7.99 |
| d2/d4 | 2.77 | 3.48 | 2.01 | 1.50 | 3.47 |
| f | 1.751 | 1.726 | 1.825 | 1.740 | 1.719 |
| f1 | 2.521 | 3.098 | 2.197 | 2.587 | 2.320 |
| f2 | −2.740 | −3.211 | −2.117 | −3.477 | −1.733 |
| f3 | 1.699 | 1.582 | 1.686 | 1.910 | 1.292 |
| f12 | 9.965 | 14.354 | 12.799 | 6.673 | −96.426 |
| FNO | 2.42 | 2.42 | 2.42 | 2.42 | 2.42 |
| TTL | 2.478 | 2.483 | 2.521 | 2.461 | 2.480 |
| IH | 1.750 | 1.750 | 1.750 | 1.750 | 1.750 |
| FOV | 88.80° | 89.00° | 87.00° | 89.40° | 89.40° |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising, from an object side to an image side:
   a first lens having a positive refractive power;
   a second lens having a negative refractive power;
   a third lens having a positive refractive power;
   wherein the camera optical lens satisfies following conditions:
   $1.20 \leq f1/f \leq 1.80$;
   $-2.00 \leq f2/f \leq -1.00$;
   $0.75 \leq f3/f \leq 1.10$;
   $-6.00 \leq R2/R1 \leq -2.00$;
   $2.20 \leq R4/R3 \leq 8.00$;
   $1.50 \leq d2/d4 \leq 3.50$;
   where
   f denotes a focal length of the camera optical lens;
   f1 denotes a focal length of the first lens;
   f2 denotes a focal length of the second lens;
   f3 denotes a focal length of the third lens;
   R1 denotes a central curvature radius of an object-side surface of the first lens;
   R2 denotes a central curvature radius of an image-side surface of the first lens;
   R3 denotes a central curvature radius of an object-side surface of the second lens;
   R4 denotes a central curvature radius of an image-side surface of the second lens;
   d2 denotes an on-axis distance from the image-side surface of the first lens to the object-side surface of the second lens;

d4 denotes an on-axis distance from the image-side surface of the second lens to an object-side surface of the third lens.

2. The camera optical lens according to claim 1, further satisfying following conditions:

$-10.00 \leq (R5+R6)/(R5-R6) \leq -3.00$;

where

R5 denotes a central curvature radius of an object-side surface of the third lens;

R6 denotes a central curvature radius of an image-side surface of the third lens.

3. The camera optical lens according to claim 1, further satisfying following conditions:

$-1.43 \leq (R1+R2)/(R1-R2) \leq -0.22$;

$0.06 \leq d1/TTL \leq 0.25$;

where d1 denotes an on-axis thickness of the first lens;

TTL denotes a total track length of the camera optical lens.

4. The camera optical lens according to claim 1, further satisfying following conditions:

$-5.33 \leq (R3+R4)/(R3-R4) \leq -0.86$;

$0.04 \leq d3/TTL \leq 0.18$;

where d3 denotes an on-axis thickness of the second lens;

TTL denotes a total track length of the camera optical lens.

5. The camera optical lens according to claim 1, further satisfying following conditions:

$0.07 \leq d5/TTL \leq 0.32$;

where d5 denotes an on-axis thickness of the third lens;

TTL denotes a total track length of the camera optical lens.

6. The camera optical lens according to claim 1, further satisfying following conditions:

$87.00° \leq FOV \leq 89.40°$;

where, FOV denotes a field of view in a diagonal direction of the camera optical lens.

7. The camera optical lens according to claim 1, further satisfying following conditions:

$TTL/IH \leq 1.45$;

where,

IH denotes an image height of the camera optical lens;

TTL denotes a total track length of the camera optical lens.

8. The camera optical lens according to claim 1, further satisfying following conditions:

$-112.19 \leq f12/f \leq 12.47$;

where f12 denotes a combined focal length of the first lens and the second lens.

* * * * *